United States Patent
Rebordosa et al.

[11] Patent Number: 5,483,848
[45] Date of Patent: Jan. 16, 1996

[54] DRIVE MECHANISM FOR A KITCHEN APPLIANCE

[75] Inventors: Antonio Rebordosa, Oberursel; Jürgen Golob, Friedrichsdorf, both of Germany

[73] Assignee: Braun Aktiengesellschaft, Frankfurt, Germany

[21] Appl. No.: 216,604

[22] Filed: Mar. 17, 1994

[30] Foreign Application Priority Data

Apr. 2, 1993 [DE] Germany .......................... 43 10 847.4

[51] Int. Cl.[6] ...................................................... F16H 3/08
[52] U.S. Cl. ............................. 74/371; 74/355; 74/665 H
[58] Field of Search .................................. 74/371 R, 372, 74/373, 421 A, 425, 340 R, 355, 665 F, 665 H, 16, 342; 475/269, 298, 300

[56] References Cited

U.S. PATENT DOCUMENTS

| | | | |
|---|---|---|---|
| 1,879,004 | 9/1932 | Altorfer | 74/16 |
| 1,971,968 | 8/1934 | Schmitter | 74/421 A |
| 2,152,607 | 3/1939 | Schmitter et al. | 74/421 AX |
| 2,917,929 | 12/1959 | Sprague | 74/16 |
| 4,422,343 | 12/1983 | Falkenbach et al. | 74/16 |

Primary Examiner—Rodney H. Bonck
Assistant Examiner—Peter Kwon
Attorney, Agent, or Firm—Fish & Richardson

[57] ABSTRACT

The invention is directed to a drive mechanism for a kitchen appliance with a drive motor (4), in which a variable-speed transmission (5) provides with an output shaft (14) a tool output for the coupling of tools adapted to be driven by the tool output at two different speeds of rotation at a given motor speed. The output shaft (14) of the variable-speed transmission (5) is axially displaceable and is movable by axial displacement from a first position in which it is coupled to a first gear wheel (18), into a second position in which it is disengaged from the first gear wheel (18), being instead coupled to a second gear wheel (17) or to the motor shaft (25).

16 Claims, 2 Drawing Sheets

DRIVE MECHANISM FOR A KITCHEN APPLIANCE

This invention relates to a drive mechanism for a kitchen appliance, including a drive motor and a transmission means with a tool output for the coupling of tools adapted to be driven by the tool output at two different speeds of rotation at a given motor speed.

BACKGROUND OF THE INVENTION

From German Patent No. DE-PS 34 33 008 a drive mechanism for a kitchen appliance is known which includes two output shafts concentric with each other and driven at two different speeds, with the adjacent ends of the two output shafts having each a coupling means for the coupling of tools. In this arrangement, the inner high-speed output shaft is formed by the motor shaft, while the slow-speed output shaft which is configured as a hollow shaft is driven by a planetary drive means whose sun gear is connected with the motor shaft and whose planet carrier is connected with the hollow shaft. This known drive mechanism is relatively complex. It necessitates two different coupling means for the coupling of the tools, in addition to requiring the motor to be arranged coaxially with the tool output.

It is an object of the present invention to provide a drive mechanism for a Kitchen appliance of the type initially referred to which includes only one output shaft and is characterized by a simple, low-cost and compact construction.

SUMMARY OF THE INVENTION

According to the present invention, this object is accomplished in that the transmission means is a variable-speed transmission whose sole output shaft providing the tool output is movable by axial displacement from a first position in which the output shaft is coupled to a first gear wheel, into a second position in which the output shaft is disengaged from the first gear wheel, being instead coupled to a second gear wheel or to the motor shaft.

In the drive mechanism of the present invention, only one output shaft is provided which is adapted to be driven at different speeds of rotation by means of a variable-speed transmission. The change from one speed to another is accomplished by changing the position of the output shaft in an axial direction which can be brought about by the respective tool to be coupled. In consequence, the appropriate transmission ratio can be set by the tool to be coupled, thus enabling each tool to be automatically assigned the appropriate transmission ratio for its actuation. The need for separate switchgears for changing the variable-speed transmission is thus obviated.

Another proposal of the present invention may provide for the output shaft of the variable-speed transmission to be held in the first position by the force of a spring taking support upon the output shaft in an axial direction, in which first position the speed of rotation of the output shaft is reduced and the output end of the output shaft provided with a tool coupling means protrudes from the transmission a greater amount. This construction enables the variable-speed transmission to change readily from the first into a second or also third position by means of an axial force overcoming the spring force. It is thus sufficient to position the coupling member provided on the tools such that the output shaft will be urged into the appropriate position when the tool is being attached. If no tool is in coupling engagement, the spring urges the output shaft back into the slow-speed position. The tools rotating at slow speed thus requiring no special means for displacing the output shaft, they may be mounted on the output shaft exclusively. According to the present invention, the tools provided for axial displacement of the output shaft incorporate a thrust bearing attachable to the housing of the kitchen appliance and positioning the tool coupling means in an axial direction. In accordance with the present invention, the spring acting on the output shaft in an axial direction may be a leaf spring upon which the end of the output shaft opposite the output end takes support.

According to a further proposal of the present invention, for coupling the output shaft a multi-tooth coupling may be provided in the transmission means, with the output shaft including a coupling pinion with external teeth, while the gear wheels include coupling bores with internal teeth. Such a multi-tooth coupling affords ease of manufacture and ready coupling. According to the present invention, the variable-speed transmission may include a slow-speed back gearing having two pairs of gear wheels which are in continuous engagement with each other. Configuring the transmission in this manner permits a compact construction at low constructional expenditure and is especially suitable for effecting the speed change of the present invention by means of the axially movable output shaft. To obtain a low overall height and a greater variability with respect to the arrangement of the motor, the invention may further provide that a high-speed gear wheel mounted on the output shaft is connected with a worm gear which is in meshing engagement with a worm driven by the motor. It is thereby possible to dispose the motor laterally adjacent to the variable-speed transmission, so that the overall height of the motor is not additive to the overall height of the variable-speed transmission. In this configuration, the internally toothed coupling bore may be advantageously provided in the worm gear. This contributes to reducing the diameters of the gear wheels, enabling the worm and the motor shaft to be arranged in the center plane of the variable-speed transmission.

BRIEF DESCRIPTION OF THE DRAWINGS

An embodiment of the present invention will now be described in more detail in the following with reference to the accompanying drawings. In the drawings.

DESCRIPTION OF PARTICULAR EMBODIMENT

Figure 1:
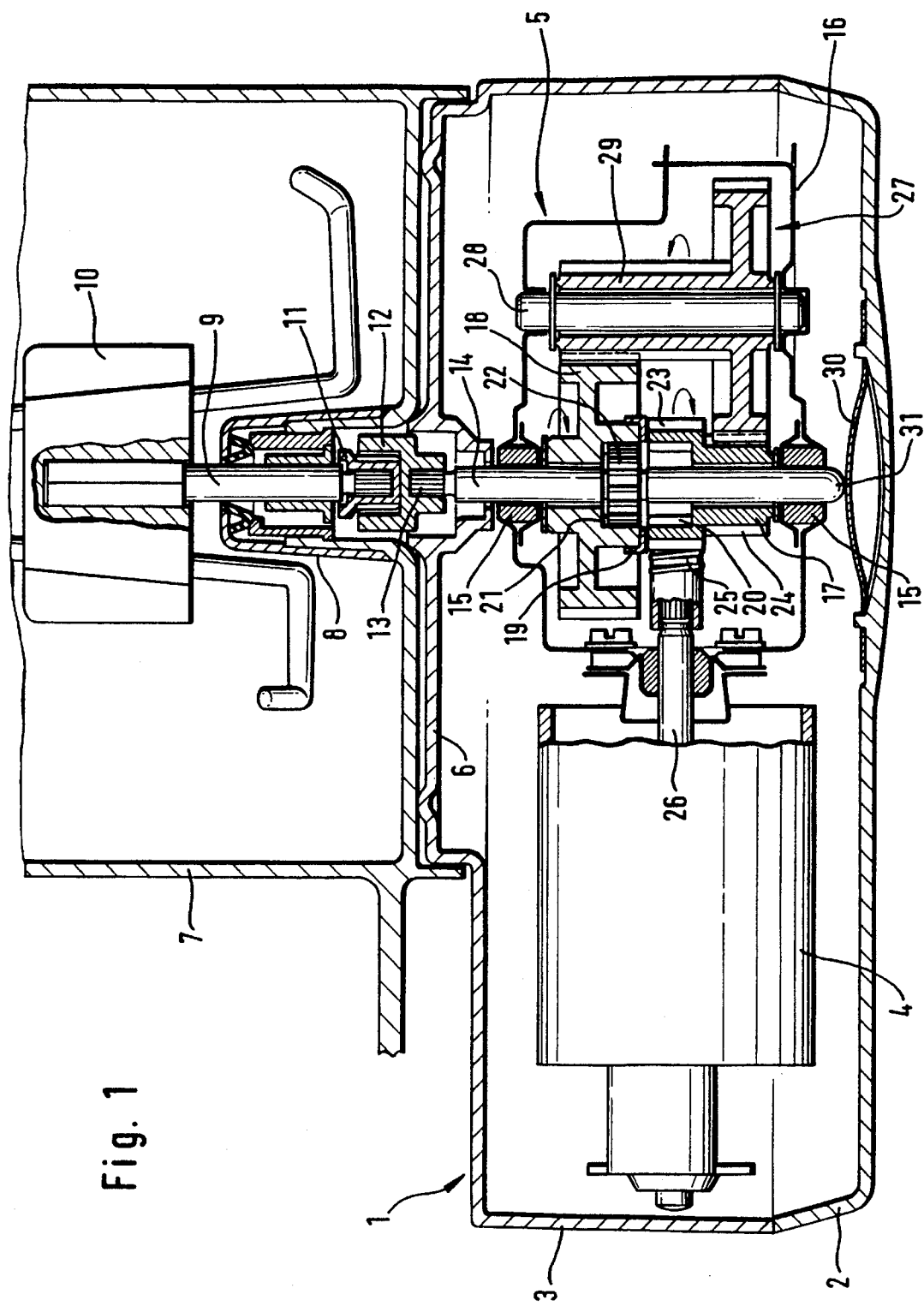
FIG. 1 is a cross-sectional view of the lower portion of a kitchen appliance including a drive mechanism constructed in accordance with the present invention.

Referring now to FIG. 1 of the drawings, there is shown a base 1 of a kitchen appliance suitable for mixing, blending, chopping or kneading food materials. The appliance base 1 forms a housing which is composed of a base plate 2 and an upper portion 3 and encloses a drive mechanism comprised of an electric drive motor 4 and a variable-speed transmission 5. The upper portion 3 includes a cylindrical flange 6 onto which a processing container 7 is seatable. The processing container 7 has in its interior a central dome-shaped structure 8 in which a tool shaft 9 is rotatably mounted, the tool shaft carrying in the interior of the processing container 7 a tool 10 in the form of a dough hook. The lower end of the tool shaft 9 in the interior of the dome-shaped structure 8 is provided with a coupling pin 11 engaging within a coupling sleeve 12 disposed in the center of the upper portion 3. The coupling sleeve 12 is secured to an output end 13 of an output shaft 14 of the drive mechanism, which end protrudes from the appliance base 1.

The output shaft 14 is part of the variable-speed transmission 5 and rotatably and axially slidably carried in spherical-segment shaped bearings 15 on opposite sides of a transmission housing 16. In the interior of the transmission housing 16, a high-speed gear wheel 17 and a slow-speed gear wheel 18 are mounted on the output shaft 14 so as to be freely rotatable. The gear wheels 17, 18 are mounted in an axial direction on the ends of the spherical-segment shaped bearings 15 and bear against each other through the intermediary of a bearing plate 19 having a collar for guiding the plate on the gear wheel 18. In their ends facing each other, the gear wheels 17, 18 are provided with internally toothed coupling bores 20, 21 which, depending on the position of the output shaft 14, are engaged by an externally toothed coupling pinion 22 mounted on the output shaft 14.

On its outer surface the gear wheel 17 has radial teeth 23 of a larger diameter as well as radial teeth 24 of a smaller diameter. The radial teeth 23 adjacent to the gear wheel 18 are engaged by a worm 25 secured to a motor shaft 26 of the drive motor 4, the motor shaft extending into the transmission housing 16 so as to be tangent to the output shaft 14. The gear wheel 18 is equally equipped with radial teeth on its outer surface.

The gear wheels 17, 18 are in mesh with a back gearing 27 comprised of a stepped spur gear 29 rotatably mounted on a fixed axle 28.

In the representation of FIG. 1, the coupling pinion 22 engages in the coupling bore 21 provided in the gear wheel 18. The output shaft 14 is then in its upper position in which the coupling sleeve 12 protrudes from the appliance base a greater amount. The output shaft 14 is held in this position by a leaf spring 30 affixed to the base plate 2 and acting on the end 31 of the output shaft 14 opposite the shaft output end 13. To reduce friction, the shaft end 31 is of a rounded configuration. Thus, only a small central contact area thereof rests on the leaf spring 30.

Figure 2:
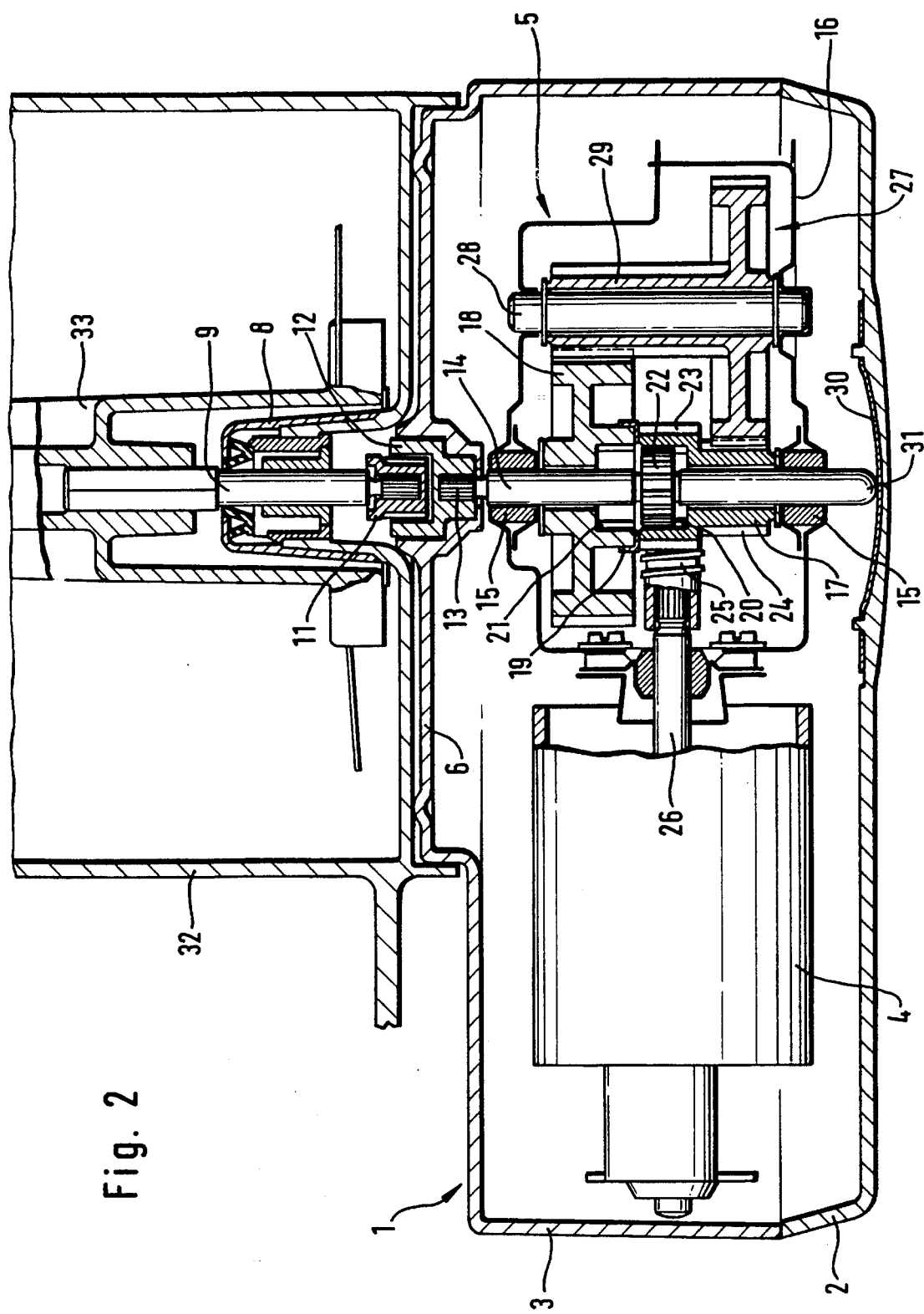
FIG. 2 is a cross-sectional view of the lower portion of the kitchen appliance of FIG. 1 in which the variable-speed transmission is changed to provide a high-speed output.

In the position shown in FIG. 1, the output shaft 14 is coupled to the gear wheel 18 which is driven through the back gearing 27 and rotates at slow speed at a correspondingly higher driving torque. By contrast, if a high-speed output is required, the processing container 7 is lifted off and, as shown in FIG. 2, is replaced with a processing container 32 which contains, for example, a tool 33 in the form of a beater blade. In the processing container 32, the lower end of the tool shaft 9 carrying the coupling pin 11 protrudes from the dome-shaped structure 8 a greater amount, so that on seating the processing container 32 in place, the output shaft 14 will be urged into the lower position shown under deformation of the leaf spring 30, in which lower position the coupling pinion 22 engages only the coupling bore 21. The output shaft 14 is thus disengaged from the slow-speed gear wheel 18, being instead coupled to the high-speed gear wheel 17 driven directly by the worm 25. The tool 33 is thus driven at a higher speed and at a correspondingly lower driving torque.

In addition, in either position of the output shaft 14 the possibility exists to vary the speed of rotation by controlling the drive motor 4 correspondingly.

It will be understood that the displacement of the output shaft 14 necessary for a high-speed output as shown in FIG. 2 may also be accomplished by other suitable means when, for example, only a single processing container is provided. Thus, for example, the high-speed tools may be equipped with a longer coupling pin or, alternatively, an intermediate member may be provided which is then inserted between the coupling pin and the coupling sleeve to obtain a high-speed output.

We claim:

1. A drive mechanism for a kitchen appliance comprising a drive motor and a transmission means with a tool output for the coupling of tools adapted to be driven by the tool output at two different speeds of rotation at a given motor speed, said transmission means being a variable-speed transmission (5) having a sole axially displaceable output shaft (14) providing the tool output, said output shaft (14) being movable by axial displacement from a first position in which it is coupled to a first gear wheel (18), into a second position in which it is disengaged from said first gear wheel (18), being instead coupled to a second gear wheel (17) or to the motor shaft.

2. The drive mechanism of claim 1 wherein said output shaft (14) is held in the first position by the force of a spring (30), in which first position the output speed is reduced and the output end (13) of said output shaft (14) provided with a tool coupling means (12) protrudes from said variable-speed transmission (5) a greater amount.

3. The drive mechanism of claim 2 wherein said spring (30) is a leaf spring, and the end (31) of said output shaft (14) opposite said output end (13) takes support upon said leaf spring (30) in an axial direction.

4. The drive mechanism as claimed in any one of the preceding claims wherein the tools (33) provided for axial displacement of said output shaft incorporate a thrust bearing attachable to the housing of the kitchen appliance and positioning the tool coupling means (11) in an axial direction.

5. The drive mechanism of any one of claims 1–3 wherein a multi-tooth coupling is provided for coupling said output shaft (14), said multi-tooth coupling including a coupling pinion (22) with external teeth, and gear wheels (17, 18) including coupling bores (20, 21) with internal teeth.

6. The drive mechanism of any one of claims 1–3 wherein said variable-speed transmission (5) includes a slow-speed back gearing (27) having two pairs of gear wheels (17, 18, 29) which are in continuous engagement with each other.

7. The drive mechanism of any one of claims 1–3 wherein a high-speed gear wheel (17, 24) mounted on said output shaft (14) is connected with a worm gear (17, 23) which is in meshing engagement with a worm (25) driven by said drive motor (4).

8. The drive mechanism of claim 7 wherein an internally toothed coupling bore (21) is provided in said worm gear (17, 24).

9. The drive mechanism as claimed in claim 1 wherein the tools (33) provided for axial displacement of said output shaft incorporate a thrust bearing attachable to the housing of the kitchen appliance and positioning the tool coupling means (11) in an axial direction; and a multi-tooth coupling is provided for coupling said output shaft (14), said multi-tooth coupling including a coupling pinion (22) with external teeth, and gear wheels (17, 18) including coupling bores (20, 21) with internal teeth.

10. The drive mechanism of claim 9 wherein said variable-speed transmission (5) includes a slow-speed back gearing (27) having two pairs of gear wheels (17, 18, 29) which are in continuous engagement with each other.

11. The drive mechanism of claim 10 wherein a high-speed gear wheel (17, 24) mounted on said output shaft (14) is connected with a worm gear (17, 23) which is in meshing engagement with a worm (25) driven by said drive motor (4).

12. The drive mechanism of claim 9 wherein said output shaft (14) is held in the first position by the force of a spring (30), in which first position the output speed is reduced and the output end (13) of said output shaft (14) provided with a tool coupling means (12) protrudes from said variable-speed transmission (5) a greater amount.

13. The drive mechanism of claim 1 wherein said variable-speed transmission (5) includes a slow-speed back gearing (27) having two pairs of gear wheels (17, 18, 29) which are in continuous engagement with each other; and a multi-tooth coupling is provided for coupling said output shaft (14), said multi-tooth coupling including a coupling pinion (22) with external teeth, and gear wheels (17, 18) including coupling bores (20, 21) with internal teeth.

14. The drive mechanism of claim 13 wherein a high-speed gear wheel (17, 24) mounted on said output shaft (14) is connected with a worm gear (17, 23) which is in meshing engagement with a worm (25) driven by said drive motor (4).

15. The drive mechanism of claim 14 wherein an internally toothed coupling bore (21) is provided in said worm gear (17, 24).

16. The drive mechanism of claim 15 wherein said output shaft (14) is held in the first position by the force of a spring (30), in which first position the output speed is reduced and the output end (13) of said output shaft (14) provided with a tool coupling means (12) protrudes from said variable-speed transmission (5) a greater amount.

* * * * *

UNITED STATES PATENT AND TRADEMARK OFFICE
CERTIFICATE OF CORRECTION

PATENT NO. : 5,483,848
DATED : January 16, 1996
INVENTOR(S) : Antonio Rebordosa et al.

It is certified that error appears in the above-indentified patent and that said Letters Patent is hereby corrected as shown below:

On the Title page, item [56], References Cited, please insert the following:

--Foreign Patent Documents

DE 34 33 008      08/1984        Germany--

Signed and Sealed this

Twenty-third Day of April, 1996

Attest:

BRUCE LEHMAN

Attesting Officer

Commissioner of Patents and Trademarks